United States Patent [19]

Buchanan et al.

[11] Patent Number: 5,090,451

[45] Date of Patent: * Feb. 25, 1992

[54] COMBINATION STEAM AND FUEL OIL SUPPLY AND PURGE VALVE WITH RECIRCULATION FEATURE

[75] Inventors: Bascom F. Buchanan, Sarasota, Fla.; Joseph R. Buchanan, Portland, Conn.

[73] Assignee: ITT Corporation, New York, N.Y.

[ * ] Notice: The portion of the term of this patent subsequent to Sep. 17, 2008 has been disclaimed.

[21] Appl. No.: 700,067

[22] Filed: May 2, 1991

Related U.S. Application Data

[63] Continuation of Ser. No. 493,198, Mar. 14, 1990, abandoned.

[51] Int. Cl.⁵ .............................................. F16K 11/16
[52] U.S. Cl. ................................. 137/630.22; 137/597; 431/121
[58] Field of Search ............ 137/597, 563, 94, 630.22; 431/29, 31, 121

[56] References Cited

U.S. PATENT DOCUMENTS

| 4,146,056 | 3/1979 | Buchanan | 137/630.22 |
| 4,454,892 | 6/1984 | Chadshay | 137/630.22 X |
| 4,565,217 | 1/1986 | McIntyre | 137/563 X |
| 4,579,143 | 4/1986 | Rollins et al. | 137/597 X |

Primary Examiner—Stephen M. Hepperle
Attorney, Agent, or Firm—McCormick, Paulding & Huber

[57] ABSTRACT

An improved combination steam and fuel oil supply and purge valve has a steam valve and actuator member which provides for a closed position, a purge operation with communication established between a steam supply line and a discharge line leading to an oil burner, and a burner operation position wherein the actuator portion of the member engages and opens a double-acting oil supply and recirculation valve member and thus establishes communication between an oil supply line and an oil discharge line to the burner. In its closed position the oil supply and recirculation valve member provides for communication between the oil supply line and a recirculation line which redirects oil to a storage tank or the like for reheating and for maintenance of a desired viscosity during burner shutdown.

15 Claims, 3 Drawing Sheets

COMBINATION STEAM AND FUEL OIL SUPPLY AND PURGE VALVE WITH RECIRCULATION FEATURE

This is a continuation of co-pending application Ser. No. 493,198 filed on Mar. 14, 1990, abandoned.

BACKGROUND OF THE INVENTION

In the firing of industrial oil burners and auxiliary or igniter burners associated with large oil fired utility or industrial boilers, it is a conventional practice to employ steam as an atomizing agent for the fuel oil. Moreover, the same source of steam is usually employed in purging fuel oil lines for safety and other considerations. A combination valve of the type under consideration and which control the supply of both steam and fuel oil during firing and purging operations of burner systems is shown in U.S. Pat. No. 4,146,056 issued Mar. 27, 1979 and entitled STEAM AND FUEL OIL CONTROL AND PURGE VALVE. The valve shown and described in the patent, which is incorporated herein by reference, is particularly well suited to the efficient control of firing and purge operations as aforesaid and is quite satisfactory in all respects. There is, however, one additional feature recently found desirable and which is lacking in the patented valve.

More particularly, oil supplied to the type of burners mentioned may be highly viscous and it may be necessary to heat the same in its storage tank in order to lower its viscosity and thereby provide for the free flow of the oil to the burner. When the fuel oil valve is closed and oil flow terminated, the oil may become highly viscous and create an impediment or even preclude restarting of the burner. If, on the other hand, oil is recirculated to the tank for reheating when its control or supply valve is closed, a desirably low level of oil viscosity may be maintained in the line leading to the valve and returning therefrom to the tank.

It is a general object of the present invention to provide an improved combination steam and fuel oil supply valve of the type mentioned and which includes a simple and straight-forward means providing for the recirculation of fuel oil from the valve to its storage tank or reservoir when the valve is closed to terminate the flow of fuel oil to its associated burner.

SUMMARY OF THE INVENTION

In fulfillment of the foregoing general object, an improved combination steam and fuel oil supply and purge valve is provided and comprises a valve body defining steam and oil inlet ports and at least one discharge port. An oil recirculation port is also provided. A steam purge passageway interconnects the steam inlet and the discharge port and an oil supply passageway interconnects the oil inlet port and the discharge port. Finally an oil recirculation passageway interconnects the oil inlet port and the oil recirculation port.

A steam valve and actuator member is movable between first, second and third positions in the valve body and is operable to open and close the steam purge passageway. A double acting oil supply and recirculation valve member which is movable between first and second positions respectively to open and close the oil supply passageway and to close and open the oil recirculation passageway has an associated biasing means which urges the same toward its second position. The steam valve and actuator member in its first and second positions respectively closes and opens the steam purge passageway. In its third position, the steam valve and actuator member closes the steam purge passageway and actuates the oil valve member whereby to urge the latter to its first position in opposition to its biasing means and thereby to open the oil supply passageway and close the oil recirculation passageway. The oil recirculation passageway has a normally open condition when the oil valve member is in its closed position.

More particularly, the valve body includes opposed spaced apart first and second valve seats each with a valve opening respectively for the control of supply and recirculation oil flow. The oil inlet port and the oil valve member are disposed between the first and second seats in the valve and the valve member is movable in one and an opposite direction between said first and second positions respectively. The first and second positions respectively represent engagement with the second and first seats whereby to open the oil passageway and close the recirculation passageway and to close the oil supply passageway and open the oil recirculation passageway.

The actuator portion of the steam valve and actuator member preferably takes the form of an elongated plunger which is engagable with the oil valve member and operable to move the same to its first position when the steam valve and actuator resides in its third position. Thus the aforesaid sequence of operation is positively and mechanically assured.

The specific construction of the oil valve member and its associated seats may vary but preferably comprises a plug type valve for a centrally bored oil supply seat. On an opposite side of the oil valve member a flat disc-like valve member is provided and the recirculation seat has a central opening for a valve stem with a plurality of small openings arranged circumaxially thereabout. Thus, the disc-like valve member opens and closes the small openings on engagement with the recirculation valve seat.

When steam or perhaps air is required for atomizing, or other purposes, the combination valve of the invention is provided with both steam and oil discharge ports as described. Thus, during a purge operation both steam and oil discharge lines may be supplied with steam or air. During running or firing operation, oil is of course supplied to the oil discharge port and its associated conduit and thence to the burner while steam or air may be supplied to the steam discharge port and its associated conduit.

In an alternative embodiment of the combination valve of the present invention, and when for example mechanically atomized burners are served by the valve, it is only necessary to provide a single discharge port and associated conduit. Thus, during a purge operation, steam or air may be provided from a steam inlet conduit and the associated steam port to the discharge port and its associated conduit. During burner operation, the discharge port and its associated conduit is of course supplied with fuel oil for delivery to the burner.

DESCRIPTION OF PREFERRED EMBODIMENTS

Figure 1:
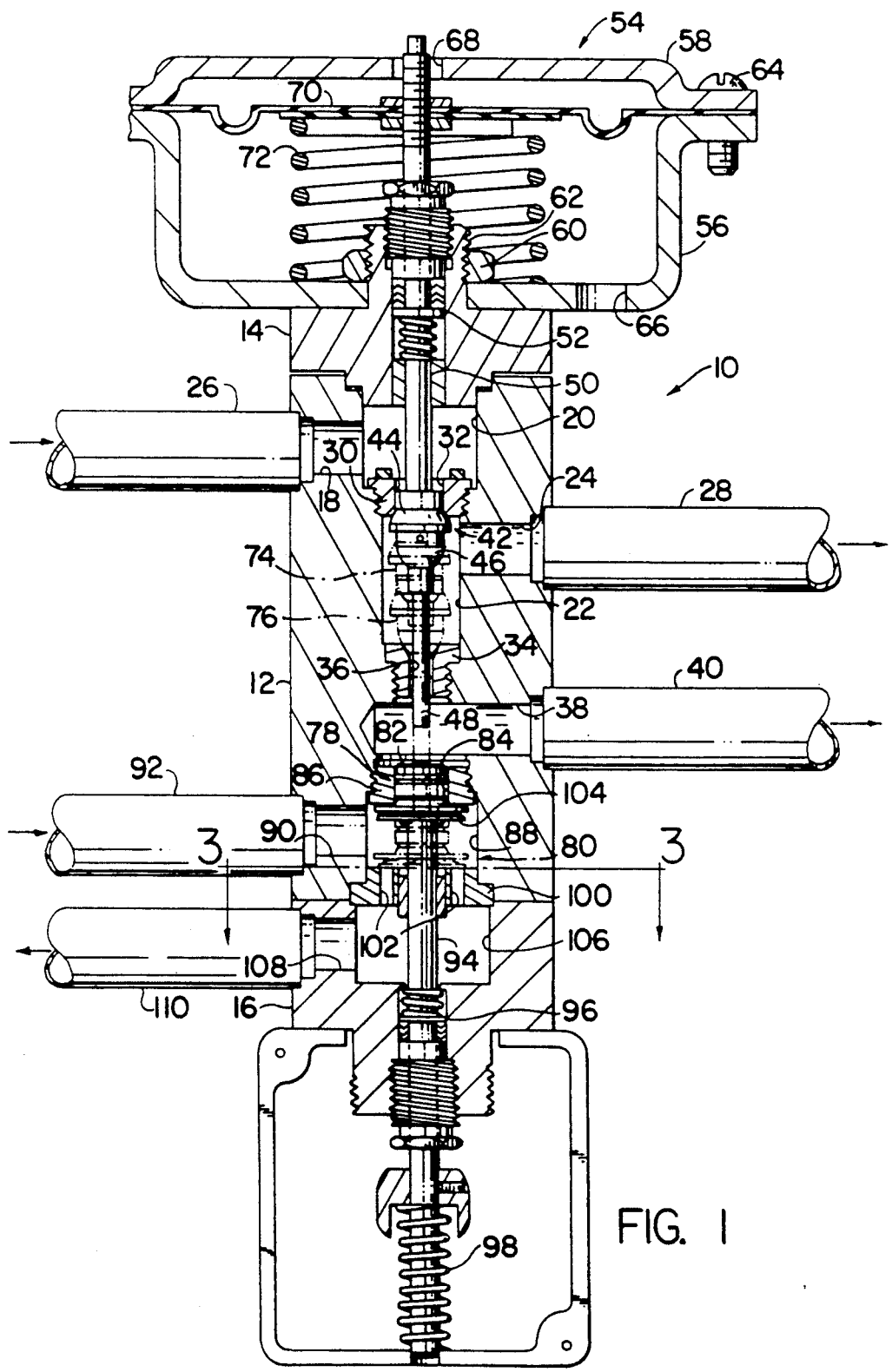
FIG. 1 of the drawings is a vertical sectional view through the improved valve of the present invention and an illustrative actuator associated therewith, various valve members being illustrated in full line in a closed position and in broken line in open positions.

Referring particularly to FIG. 1, an improved combination valve in accordance with the present invention is indicated generally at 10 and comprises a central or intermediate body portion 12 which takes a cylindrical form and which has associated upper and lower closure members or plugs 14, 16. The plugs 14, 16 may be secured in assembled position by appropriate screws or the like not shown. A steam inlet port 18 communicates with a steam inlet chamber 20 and a steam discharge chamber 22 communicates with steam discharge port 24. Steam inlet and discharge conduits 26, 28 are associated respectively with the inlet and discharge ports 18, 24.

Steam valve seat 30 has a central axial bore 32 which establishes communication between the steam inlet and discharge chambers 20, 22. At a lower end portion of the chamber 22 purge valve seat 34 has a central axial bore 36 which establishes communication between chamber 22 and an oil discharge port 38 therebeneath. The oil discharge port 38 has a corresponding conduit 40 which extends to an associated burner as does the steam discharge conduit 28.

As will be apparent from the foregoing, a steam supply passageway can be established by the steam inlet or supply conduit 26, steam inlet port 18, steam inlet chamber 20, steam valve bore 32, steam discharge chamber 22, steam discharge port 24 and steam discharge conduit 28. Similarly, a steam purge passageway can be established by steam inlet or supply conduit 26, steam inlet port 18, steam inlet chamber 20, bore 32, steam discharge chamber 22, bore 36, discharge port 38 and oil discharge conduit 40.

In accordance with the invention, a combined steam valve and actuator member is provided and is indicated generally at 42. The steam valve and actuator member 42 includes a valve having upper and lower portions 44, 46 which cooperate respectively with the steam valve seat 30 and the purge valve seat 34. An actuator portion of the member in the form of an elongated plunger or stem 48 has a function to be described more fully hereinbelow. Upwardly extending stem 50 associated with the valve and actuator member has a sealing or packing means 52 associated therewith and extends therefrom upwardly in FIG. 1 to an actuating means.

The actuating means for the steam valve and actuator member 42 may vary widely within the scope of the invention and may comprise pneumatic, hydraulic, electrical or other means. An illustrative actuating means indicated generally at 54 is of the pneumatic type. Two part housing 56, 58 for the actuator 54 comprises a lower cup shaped member secured in an upright position by nut 60 threadably engaged with an appropriate threaded stud 62 which is formed on and projects axially upwardly from the plug or closure 14. Upper housing member 58 takes an inverted cup shape and is secured to the lower cup member by means of suitable annular flanges respectively on the upper and lower members and secured together by appropriate screws or bolts 64. An atmospheric port or vent 66 is provided in the lower housing member 56 and a supply or control port 68 in the upper housing member 58 may be connected with a controlled source of air or other gas under pressure. Disposed within the actuator housing is a diaphragm 70 peripherally clamped between the housing flanges and attached to an upper end portion of the valve stem 50. A biasing or return spring 72, which may be of the coil type, has an upper end portion seated beneath the diaphragm 70 and a lower end portion seated on the bottom wall of the lower cup shaped housing member 56.

As will apparent, air or other gas under pressure may be supplied through the port 68 for actuation of the diaphragm 70, the stem 50 and its valve and actuator member 42, the spring 72 supplying the necessary biasing or reaction force. Moreover, it will apparent that appropriate control or regulation of air pressure will result in initial movement of the valve and actuator member 42 to an intermediate or purge position as illustrated by broken line 74. On an increase in the regulated pressure supplied through the port 68, further downward movement of the valve and actuator member 42 will occur to the broken line position of the valve illustrated at 76. In the reverse direction, a controlled reduction in supply pressure to the diaphragm 70 will allow the return spring 72 to urge the diaphragm, stem, and valve and actuator member upwardly to its closed full line position. Alternatively and if desired, a step reduction in pressure may be employed to move the valve and actuator member sequentially from its lower-most broken line position 76 to its intermediate broken line position at 74 for a purge operation, and thereafter to the full line closed position.

In the first, full line, or closed position of the steam valve, its upper generally frusto-conical portion 44 engages the steam seat 30 and a plug portion thereabove enters the seat bore 32. Thus, the steam inlet or supply port 18 and chamber 20 are effectively isolated from the remainder of the valve passageways, ports, and conduits. In the second or intermediate broken line position 74, the frusto-conical seating surface 44 is displaced axially downwardly from the steam seat 30 whereby to open the steam inlet chamber 20 to the steam discharge chamber 22 through the bore 32 in the seat 30. Thus, a first passageway is provided interconnecting the steam inlet and discharge ports and comprises inlet port 18, steam inlet chamber, bore 32 etc. as set forth above. Steam discharge flow through the conduit or line 28, however, may be regarded as merely incidental, purging of steam lines not ordinarily being required.

Steam flow through the aforementioned purge passageway is, however, highly significant and results in the desired purging of the oil line or conduit 40. The second or purge passageway comprises steam inlet port 18, steam inlet chamber 20, bore 32, steam discharge chamber 22, bore 36, oil discharge port 38, and oil discharge conduit 40.

When the stem valve and actuator member 42 is in its lower-most or third position, the lower portion 46 of the valve closes the bore 36 in the purge seat 34 as illustrated and steam discharge through the oil discharge conduit 40 is terminated. At the same time, the actuator stem 48 associated with the steam valve 42 engages an oil valve member, indicated generally in full line at 78, and urges the same downwardly to its broken line position 80. In its full line position, the oil valve member 78 has a plug portion 82 which enters and closes a bore 84 in oil valve seat 86. In its lower broken line position at 80, the bore 84 is opened to an oil inlet chamber 88 therebeneath which in turn communicates with an oil inlet or supply port 90 and an oil supply conduit 92. Thus, an oil supply passageway is established from the supply conduit 92 through the port 190, chamber 88, bore 84 to the oil discharge port 38 and its associated discharge conduit 40. This condition of the valve members prevails with the oil burner in operation and with atomizing steam flowing through the discharge conduit 28 and fuel oil similarly flowing to the burner through the discharge conduit 40.

Figure 4:
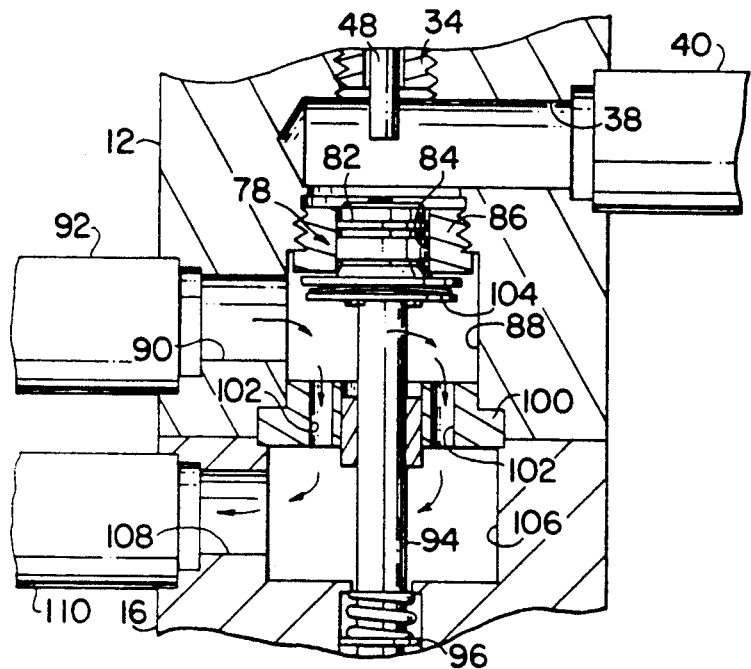
FIG. 4 is an enlarged fragmentary section of a portion of the improved valve illustrating an oil valve member in its second position wherein an oil supply passageway through the valve is closed and an oil recirculation passageway through the valve is open.
Figure 3:
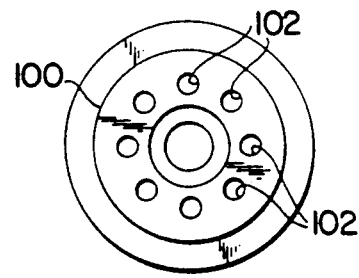
FIG. 3 is a fragmentary horizontal sectional view taken generally as indicated at 3, 3 in FIG. 1 and illustrating an oil recirculation valve seat.
Figure 5:
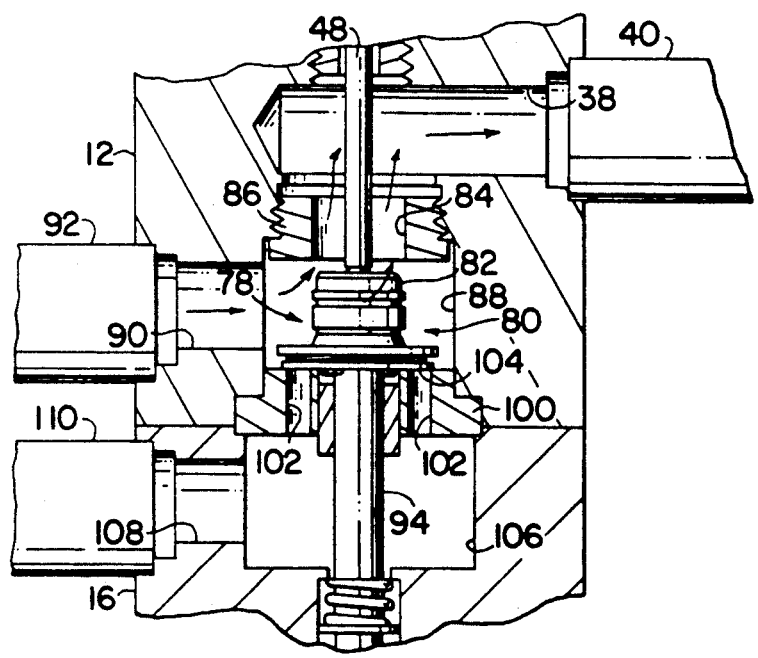
FIG. 5 is a view similar to FIG. 4 but showing the oil valve member in a first position wherein the oil supply passageway is open and the oil recirculation passageway closed.

The oil valve 78 also has an associated stem 94 which extends downwardly therefrom past a sealing or packing device 96 to a biasing spring 98. The biasing spring 98 urges the oil valve member to its second or full line position at 78 and is compressed when the actuator member 48 urges the oil valve member downwardly to its first or broken line position at 80. An associated recirculation seat 100 has a plurality of small openings 102, 102 provided therein as best illustrated in FIG. 3. That is, the stem 94 extends downwardly through a central bore in the seat 100 and the plurality of small valve openings 102, 102 are arranged circumaxially in the valve seat 100 about the central bore and the stem 94. At a lower portion thereof the valve 78 has a flat disc-like member 104 which cooperates with the valve openings 102, 102. Thus, with the valve member at its lowermost position 80, disc 104 serves to close the openings 102, 102, FIG. 5. When the oil valve member is in its upper full line position 78, FIG. 4, the openings 102, 102 are open and in communication with the oil inlet chamber 88. Thus, a recirculation chamber 106 beneath seat 100 receives oil from the openings 102, 102 and the oil in turn flows through a recirculation port 108 and a return conduit 110. As will be apparent, the viscosity of the oil may thus be maintained at a low level whenever the oil valve member 78 is in its full line or closed position with recirculation occurring at a desired location in close proximity to the oil burner.

Figure 2:
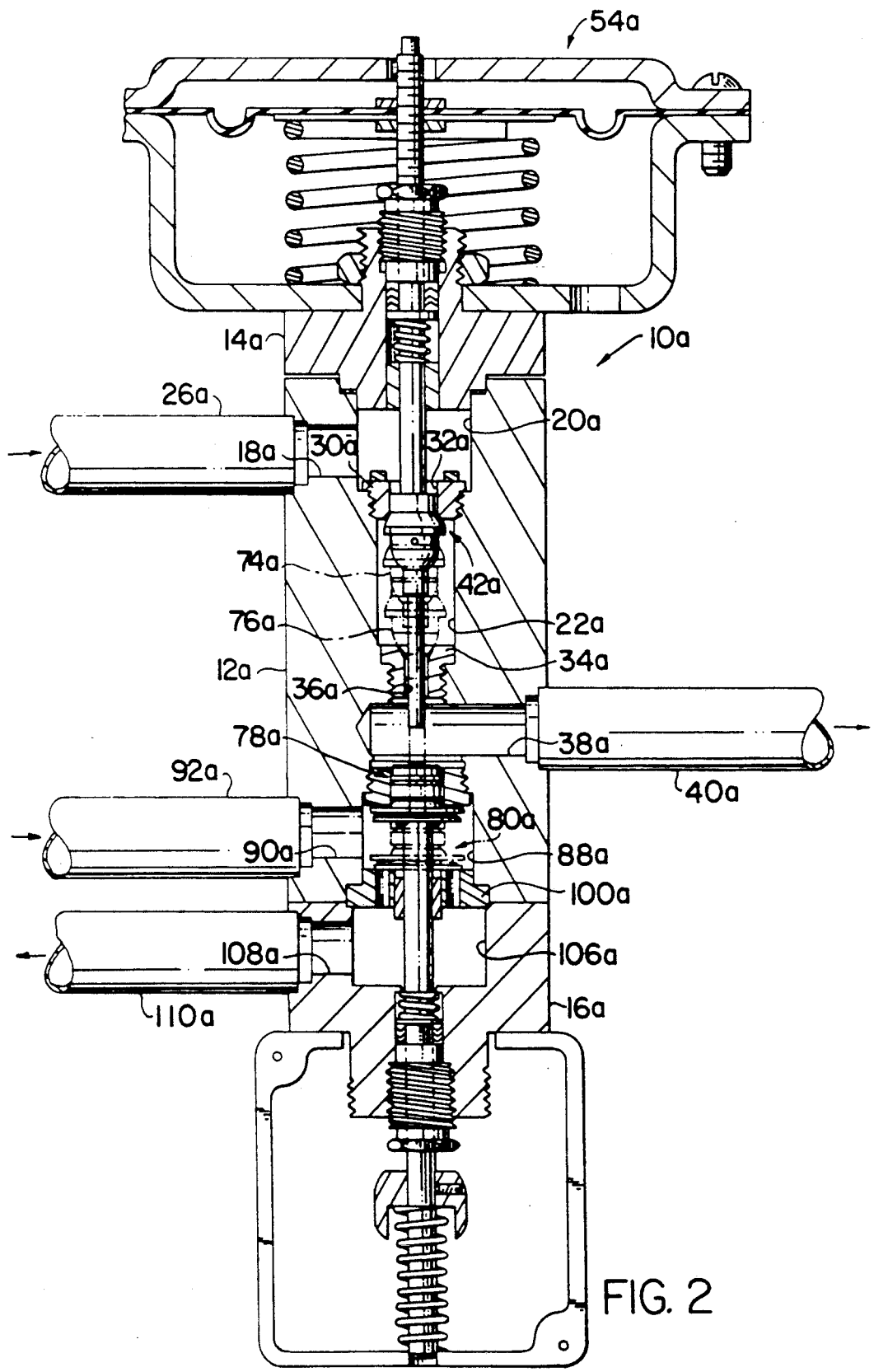
FIG. 2 is a vertical sectional view similar to FIG. 1 but showing a valve forming a second embodiment of the present invention, a single discharge port and conduit replacing the dual discharge ports and conduits of the valve of FIG. 1.

Referring now to FIG. 2, a valve construction 10a forming a second embodiment of the present invention may be employed advantageously with mechanically atomized burners not requiring steam flow to the burners for atomization during burner operation. The valve 10a may be substantially identical in all respects with the valve 10 of FIG. 1 except for the elimination of the steam discharge port 24 and its associated conduit 28. Thus, a single oil supply conduit 40a serves alternatively for a purge and oil supply or burner operation function. When steam valve and actuator member 42a is in the purge position as illustrated in broken line at 74a, steam flows from the supply conduit 26a through the steam inlet port 18a, steam inlet chamber 20a, bore 32a in seat 30a, chamber 22a, bore 36a in purge seat 34a, and to the oil discharge port 38a and conduit 40a.

Operation of the valve 10a of FIG. 2 for the supply of oil through the conduit 40a during burner operation is identical to that described above for valve 10 and the provisions for recirculation of the oil through the conduit 110a may also be identical with those described above.

From the foregoing, it will be apparent that a desirably simple and straight-forward recirculation feature is provided in the improved combination steam and fuel oil supply and purge valve of the present invention. Recirculation is achieved in an efficient and fool proof manner and a substantially improved valve construction and operation results.

We claim:

1. An improved combination steam and fuel oil supply and purge valve comprising a valve body defining steam and oil inlet ports, at least one discharge port, an oil recirculation port, a steam purge passageway interconnecting said steam inlet and discharge ports, an oil supply passageway interconnecting said oil inlet and discharge ports, an oil recirculation passageway interconnecting said oil inlet port and said oil recirculation port, a steam valve and actuator member movable between first, second, and third positions in said valve body and operable to open and close said steam purge passageway, a double-acting oil supply and recirculation valve member movable between first and second positions respectively to open and close said oil supply passageway and directly and positively close and open said oil recirculation passageway, biasing means urging said oil supply and recirculation valve member toward its second position, said steam valve and actuator member in its first and second positions respectively closing and opening said steam purge passageway, and said valve and actuator member in its third position closing said steam purge passageway and actuating said oil valve member whereby to urge said member to its first position in opposition to said biasing means and thereby open said oil supply passageway and close said oil recirculation passageway, said oil recirculation passageway having a normally open condition with said oil supply and recirculation valve member in its closed position.

2. An improved combination steam and fuel oil supply and purge valve as set forth in claim 1 wherein said valve includes opposed spaced apart oil supply and recirculation valve seats each with a valve opening respectively for the control of supply oil and recirculation oil flow, and wherein said oil inlet port and oil supply and recirculation valve member are disposed between and said seats and corresponding valve openings with the valve member movable in one and opposite directions between its said first and second positions respectively, said first and second positions being in engagement respectively with said recirculation and oil supply seats whereby to open the oil supply passageway and close the recirculation passageway and close the oil supply passageway and open the oil recirculation passageway.

3. An improved combination steam and fuel oil supply and purge valve as set forth in claim 2 wherein said valve and actuator members are of generally cylindrical and axially slidable types in an end-to-end arrangement with the actuator portion of the steam valve and actuator member comprising an elongated plunger engagable with the oil supply and recirculation valve member and operable to move the same to its first position when the steam valve and actuator member resides at its said third position.

4. An improved combination steam and fuel oil supply and purge valve as set forth in claim 3 wherein the oil supply and recirculation valve member has an associated axially projecting stem operatively connected remotely with the biasing means and extending through the recirculation seat, said valve opening in said recirculation seat comprising a plurality of small axial openings extending through the seat and arranged circumaxially about the stem.

5. An improved combination steam and fuel oil supply and purge valve as set forth in claim 4 wherein the oil supply seat has a central axial opening, and wherein the oil supply and recirculation valve member has a portion thereof in plug form for entering and closing said central opening and an opposite flat disc-like portion for overlaying and closing said plurality of small axial openings in said recirculation valve seat.

6. An improved combination steam and fuel oil supply and purge valve comprising a valve body defining steam and oil inlet ports, steam and oil discharge ports, an oil recirculation port, a steam purge passageway interconnecting said steam inlet and oil discharge ports, a stem supply passageway interconnecting said steam inlet and discharge ports, an oil supply passageway interconnecting said oil inlet and discharge ports, an oil recirculation passageway interconnecting said oil inlet port and said oil recirculation port, a steam valve and actuator member movable between first, second, and third positions in said valve body and operable to open and close said steam purge passageway, a double-acting oil supply and recirculation valve member movable between first and second positions respectively to open and close said oil supply passageway and directly and positively close and open said oil recirculation passageway, biasing means urging said oil supply and recirculation valve member toward its second position, said steam valve and actuator member in its first and second positions respectively closing and opening said steam purge passageway, and said steam valve and actuator member in its third position closing said steam purge passageway, opening said steam supply passageway, and actuating said oil supply and recirculation valve member whereby to urge said member to its first position in opposition to said biasing means and thereby open said oil supply passageway and close said oil recirculation passageway, said oil recirculation passageway having a normally open condition with said oil valve member in its closed position.

7. An improved combination steam and fuel oil supply and purge valve as set forth in claim 6 wherein said valve includes opposed spaced apart oil supply and recirculation valve seats each with a valve opening respectively for the control of supply oil and recirculation oil flow, and wherein said oil inlet port and oil supply and recirculation valve member are disposed between said seats and corresponding valve openings with the valve member movable in one and opposite directions between its said first and second positions respectively, said first and second positions being in engagement respectively with said recirculation and oil supply seats whereby to open the oil supply passageway and close the recirculation passageway and close the oil supply passageway and open the oil recirculation passageway.

8. An improved combination steam and fuel oil supply and purge valve as set forth in claim 7 wherein said valve and actuator members are of generally cylindrical and axially slidable types in an end-to-end arrangement with the actuator portion of the steam valve and actuator member comprising an elongated plunger engagable with the oil supply and recirculation valve member and operable to move the same to its first position when the steam valve and actuator member resides at its said third position.

9. An improved combination steam and fuel oil supply and purge valve as set forth in claim 8 wherein the oil supply and recirculation valve member has an associated axially projecting stem operatively connected remotely with the biasing means and extending through the recirculation seat, said valve opening in said recirculation seat comprising a plurality of small axial openings extending through the seat and arranged circumaxially about the steam.

10. An improved combination steam and fuel oil supply and purge valve as set forth in claim 9 wherein the oil supply seat has a central axial opening, and wherein the oil supply and recirculation valve member has a portion thereof in plug form for entering and closing said central opening and an opposite flat disc-like portion for overlaying and closing said plurality of small axial openings in said recirculation valve seat.

11. An improved combination steam and fuel oil supply and purge valve comprising a valve body defining steam and oil inlet ports, a single discharge port, an oil recirculation port, a steam purge passageway interconnecting said steam inlet port and said discharge port, an oil supply passageway interconnecting said oil inlet port and said discharge port, an oil recirculation passageway interconnecting said oil inlet port and said oil recirculation port, a steam valve and actuator member movable between first, second, and third positions in said valve body and operable to open and close said steam purge passageway, a double-acting oil supply and recirculation valve member movable between first and second positions respectively to open and close said oil supply passageway and directly and positively close and open said oil recirculation passageway, biasing means urging said oil supply and recirculation valve member toward its second position, said steam valve and actuator member in its first and second positions respectively closing and opening said steam purge passageway, and said valve and actuator member in its third position closing said steam purge passageway and actuating said oil supply and recirculation valve member whereby to urge said member to its first position in opposition to said biasing means and thereby open said oil supply passageway and close said oil recirculation passageway, said oil recirculation passageway having a normally open condition with said oil supply and recirculation valve member in its closed position.

12. An improved combination steam and fuel oil supply and purge valve as set forth in claim 11 wherein said valve includes opposed spaced apart oil supply and recirculation valve seats each with a valve opening respectively for the control of supply oil and recirculation oil flow, and wherein said oil inlet port and oil supply and recirculation valve member are disposed between said seats and corresponding valve openings with the valve member movable in one and opposite directions between its said first and second positions respectively, said first and second positions being in engagement respectively with said recirculation and oil supply seats whereby to open the oil supply passageway and close the recirculation passageway and close the oil supply passageway and open the oil recirculation passageway.

13. An improved combination steam and fuel oil supply and purge valve as set forth in claim 12 wherein said valve and actuator members are of generally cylindrical and axially slidable types in an end-to-end arrangement with the actuator portion of the steam valve and actuator member comprising an elongated plunger engagable with the oil supply and recirculation valve member and operable to move the same to its first position when the steam valve and actuator member resides at its said third position.

14. An improved combination steam and fuel oil supply and purge valve as set forth in claim 13 wherein the oil supply and recirculation valve member has an associated axially projecting stem operatively connected remotely with the biasing means and extending through the recirculation seat, said valve opening in said recirculation seat comprising a plurality of small axial openings extending through the seat and arranged circumaxially about the steam.

15. An improved combination steam and fuel oil supply and purge valve as set forth in claim 14 wherein the oil supply seat has a central axial opening, and wherein the oil supply and recirculation valve member has a portion thereof in plug form for entering and closing said central opening and an opposite flat disc-like portion for overlaying and closing said plurality of small axial openings in said recirculation valve seat.

* * * * *